United States Patent
Nemeth et al.

(10) Patent No.: US 6,364,232 B1
(45) Date of Patent: Apr. 2, 2002

(54) RECORDING AND/OR REPRODUCING DEVICE HAVING A TAKE-UP REEL AND HAVING A TAPE PULL-OUT ASSEMBLY WHICH CAN BE POSITIONED TANGENTIALLY WITH RESPECT TO THE TAKE-UP REEL

(75) Inventors: Robert Nemeth, Vienna; Hubert Schönhart, Guntramsdorf, both of (AT)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/600,194
(22) PCT Filed: Nov. 11, 1999
(86) PCT No.: PCT/EP99/08952
    § 371 Date: Jul. 12, 2000
    § 102(e) Date: Jul. 12, 2000
(87) PCT Pub. No.: WO00/30092
    PCT Pub. Date: May 25, 2000

(30) Foreign Application Priority Data

Nov. 12, 1998 (EP) .............................................. 98890332

(51) Int. Cl.⁷ ................................................. G03B 1/58
(52) U.S. Cl. ................................ 242/332.4; 242/332.7; 242/582

(58) Field of Search .............................. 242/348, 348.2, 242/348.3, 332.4, 332.7, 332.8, 532.1, 532.6, 532.7, 582

(56) References Cited

U.S. PATENT DOCUMENTS

| | | | | |
|---|---|---|---|---|
| 3,664,607 A | * | 5/1972 | Trefzger et al. | 242/332.4 |
| 3,934,840 A | * | 1/1976 | Inaga | 242/332.4 |
| 4,059,211 A | * | 11/1977 | Brizzolara | |
| 4,635,147 A | * | 1/1987 | Durand et al. | |
| 5,443,220 A | * | 8/1995 | Hoge et al. | 242/332.8 |
| 5,927,633 A | * | 7/1999 | McAllister | 242/332.4 |
| 5,979,813 A | * | 11/1999 | Mansbridge et al. | 242/332.4 |
| 6,079,651 A | * | 6/2000 | Hamming | 242/332.4 |
| 6,082,652 A | * | 7/2000 | Theobald | 242/332.4 |

FOREIGN PATENT DOCUMENTS

WO        9844499        10/1998

* cited by examiner

Primary Examiner—William A. Rivera (57) ABSTRACT

A recording and/or reproducing device including a cassette, which contains a magnetic tape and a coupling pin connected to the magnetic tape. The cassette can be loaded into the device. The device includes a pull-out element which can be coupled to the coupling element so as to form a pull-out assembly. The pull-out assembly can be moved to a reel hub of a take-up reel. A tangential positioning means is provided between the reel hub and the pull-out assembly for tangentially positioning the pull-out assembly on the reel hub.

5 Claims, 9 Drawing Sheets

RECORDING AND/OR REPRODUCING DEVICE HAVING A TAKE-UP REEL AND HAVING A TAPE PULL-OUT ASSEMBLY WHICH CAN BE POSITIONED TANGENTIALLY WITH RESPECT TO THE TAKE-UP REEL

Recording and/or reproducing device having a take-up reel and having a tape pull-out assembly which can be positioned tangentially with respect to the take-up reel.

The invention relates to a recording and/or reproducing device, into which a cassette can be loaded, which cassette comprises a housing and a rotationally drivable supply reel accommodated in the housing and a record carrier in the form of a tape wound onto the reel hub of the supply reel and a coupling element connected to the record carrier in the area of the free end of the record carrier and held in a coupling position, and which comprises a rotationally drivable take-up reel having a reel hub and a lower reel flange, and which comprises a pull-out element constructed to be coupled to the coupling element, and which comprises retaining means constructed to detachably retain the pull-out element and enabling the pull-out element to be retained in an area in which a coupling to the coupling element can be effected and thereby a pull-out assembly can be formed, which pull-out assembly comprises the pull-out element and the coupling element coupled thereto, and by which retaining means the pull-out element is detachable after its coupling to the coupling element, and which comprises actuating means by which the pull-out assembly can be moved away from the retaining means and up to the reel hub of the take-up reel, in order to bring into engagement with one another, on the one hand, the reel hub and, on the other hand, the pull-out assembly comprising the pull-out element and the coupling element coupled thereto, where with the pull-out assembly brought into engagement with reel hub of the take-up reel a) a partly cylindrical circumferential surface of the reel hub and a partly cylindrical circumferential surface of the pull-out assembly together form a cylindrical winding surface onto which the record carrier in the form of a tape can be wound, and b) the reel hub and the pull-out assembly adjoin one another in the area of a separating zone, and c) the reel hub and the pull-out assembly are positioned with respect to one another in a tangential direction of the reel hub with the aid of tangential positioning means.

Such a recording and/or reproducing device of the type defined in the opening paragraph is known, for example from the patent document WO 98/44499 A1. In the known recording and/or reproducing device the tangential positioning means comprise a positioning wedge which projects from the reel hub of the take-up reel in the area of the separating zone and a positioning recess formed in the pull-out assembly. The positioning wedge is integral with the reel hub of the take-up reel and is made of a plastic. The positioning recess of the pull-out assembly is formed by a recess in the coupling element, which is also made of a plastic. Thus, the tangential positioning means are formed by plastic parts, as a result of which the accuracy of the construction of the tangential positioning means is unsatisfactory because plastic parts can be manufactured only with a limited accuracy, which manifests itself in a limited positioning accuracy in the long run because in particular such a plastic positioning wedge wears out comparatively rapidly and, as a consequence, the positioning accuracy deteriorates as the lifetime becomes longer. Moreover, it has also proved to be unfavorable in the known recording and/or reproducing device that the tangential positioning of the pull-out assembly with respect to the reel hub of the take-up reel by means of the positioning wedge and the positioning recess which cooperates with said wedge is effected not until immediately before the final stage of engagement of the reel hub and the pull-out assembly, during which there may already be such contact between the reel hub and the pull-out assembly that a tangential movement of the pull-out assembly with respect to the reel hub is prevented, which is detrimental to a proper and precise tangential positioning.

It is an object of the invention to preclude the aforementioned problems and to provide an improved recording and/or reproducing device of the type defined in the opening paragraph, in which an accurate tangential positioning of the pull-out assembly with respect to the reel hub of the take-up reel, which is also reproducible over a longer period of life, can be achieved and is guaranteed.

According to the invention, in order to achieve the aforesaid object in a recording and/or reproducing device of the type defined in the opening paragraph, the pull-out assembly has a lower positioning projection which extends in the axial direction of the reel hub of the take-up reel and which projects from the pull-out assembly towards the lower reel flange, and the lower reel flange has a passage for the lower positioning projection, which passage is bounded by two bounding surfaces which extend parallel to the axial direction, and at least one bounding surface of these two bounding surfaces is formed as a lower positioning surface in the area of its end at the hub side, and the lower positioning projection and the lower positioning surface belong to the tangential positioning means.

The measures in accordance with the invention simply enable the use of a positioning projection of a material with which the positioning projection can be manufactured precisely and which also guarantees a low wear over a long period of life, which is advantageous for a high positioning accuracy. Moreover, it is thus achieved that for the positioning projection a material can be chosen which has a high compatibility with the plastic material of which the take-up reel and, consequently, all the positioning surfaces of the tangential positioning means consist. A further advantage of a recording and/or reproducing device in accordance with the invention is that the bounding surfaces of the passage in the lower reel flange of the take-up reel enable a preliminary positioning, which means that a positioning process can already begin when the pull-out assembly is still comparatively far away from its final position on the reel hub of the take-up reel. This possibility of preliminary positioning has also proved to be very advantageous for a maximal accuracy of the final positioning with the aid of the tangential positioning means, as has been corroborated by tests.

In a recording and/or reproducing device it has proved to be particularly advantageous if, in addition, the measures defined in claim 2 are taken, because this enables a particularly high positioning accuracy to be achieved and because this also precludes so-called canting of the pull-out assembly with respect to the reel hub of the take-up reel in a simple manner.

It has proved to be particularly advantageous to provide a cylindrical metal pin as positioning pin because such a metal pin can simply be molded around the pull-out element of the pull-out assembly and because such a metal pin can be manufactured very accurately and is hardly subject to wear.

The above-mentioned as well as further aspects of the invention will become apparent from the embodiments described hereinafter by way of example and will be elucidated with reference to these examples.

The invention will now be described in more detail with reference to the drawings, which show two embodiments given by way of example but to which the invention is not limited.

Figure 1:
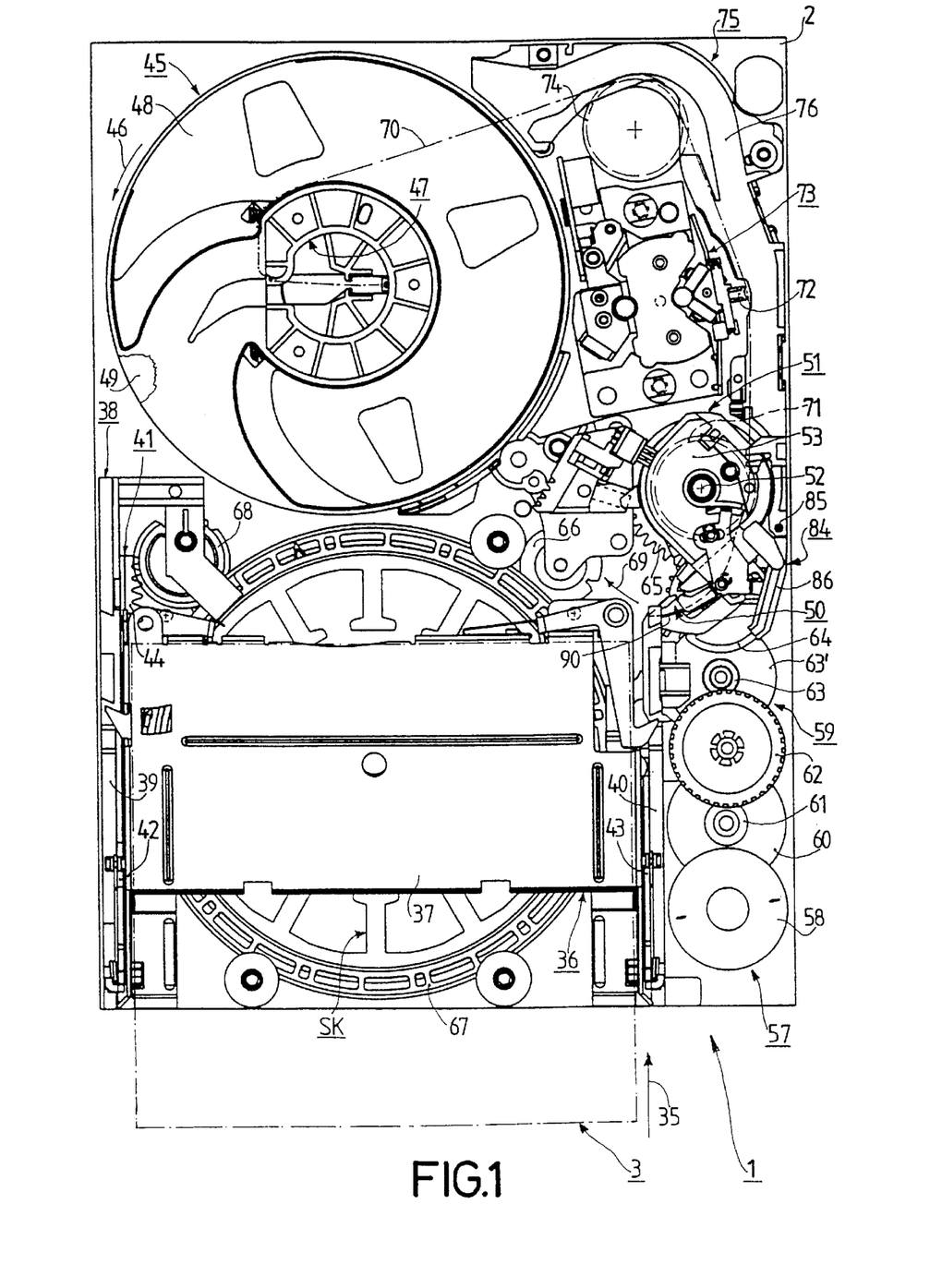
FIG. 1 is a top view of a recording and reproducing device in accordance with a first embodiment of the invention, into which a cassette can be loaded.

FIG. 1 shows a recording and reproducing device 1 in accordance with an embodiment of the invention, hereinafter briefly referred to as the device 1. The device 1 has a chassis 2, shown only diagrammatically, for carrying a multitude of component parts of the device 1. A cassette 3, shown in dash-dot lines in FIG. 1, can be loaded into the device 1. Hereinafter, the construction of the cassette 3 will first be described with reference to FIGS. 2, 3 and 4.

The cassette 3 has a housing 4, which comprises a lower housing half 5 and an upper housing half 6. With the housing halves 5 and 6 joined to one another, i.e. when the housing 4 is closed, the housing 4 has an upper wall 7 and a bottom wall 8, a front side wall 9, a rear side wall 10, a left-hand side wall 11 and a right-hand side wall 12. A grip portion 13 has been provided in the rear area of the upper wall 7 and a grip portion 14 has been provided in the rear area of the bottom wall 8.

In the area of the front side wall 9 a wedge-shaped recess 15 has been provided which, like a positioning portion 16 of the front side wall 9, serves for positioning the cassette 3 when it is moved inside the device 1. In the right-hand side wall 12 the cassette 3 has an access opening 17, which can be closed by means of a shutter 18, but which is shown in its open position in FIG. 2 and in FIG. 3, into which position it is brought automatically when the cassette 3 is loaded into the device 1.

Figure 3:
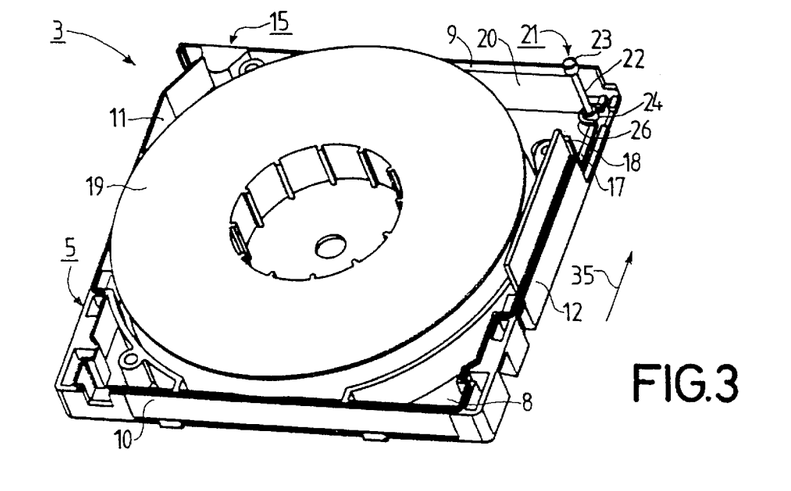
FIG. 3 is an oblique top view showing the cassette of FIG. 2 with the upper half of the housing removed.

The cassette 3 accommodates a rotationally drivable supply reel 19, as can be seen in FIG. 3. The cassette 3 further accommodates a record carrier in the form of a tape, in the present case a magnetic tape 20, wound on the reel hub of the supply reel 19. The cassette 3 further includes a coupling element 21 formed by a coupling pin 21 and connected to the magnetic tape 20 at the free end portion of the magnetic tape 20. The coupling pin 21 has a comparatively thin central portion 22 and an upper first end portion 23 and a lower second end portion 24, both end portions 23 and 24 having a larger diameter than the central portion 22. In the cassette 3 the coupling pin 21 is held in a coupling position, namely by means of two positioning forks 25 and 26 which cooperate with the two end portions 23 and 24 of the coupling pin 21. Furthermore, at least one retaining element, not shown in the Figures, may be provided, which element is movable between a retaining position and a release position and by means of which a mechanism can be actuated, which element is held in its release position by means of the mechanism upon entry of the coupling pin 21 into the cassette 3 and is subsequently moved into its retaining position and engages behind the coupling pin 21. The two end portions 23 and 24 are then held in the positioning forks 25 and 26 by means of the retaining element, as a result of which the coupling position of the coupling pin 21 is accurately defined.

The two housing halves 5 and 6 of the housing 4 are secured to one another by means of three screws 27. The screws 27 are fitted into hollow cylindrical connecting posts 28 and 29, of which hollow cylindrical connecting posts 28 and 29 are visible through the access opening 17 in FIG. 2.

Figure 2:
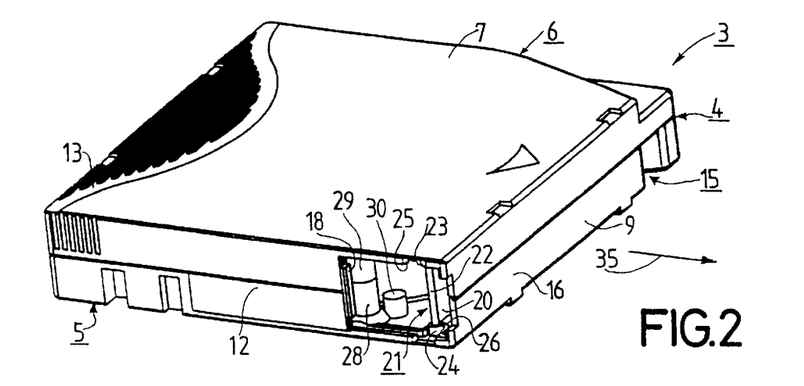
FIG. 2 is an oblique top view of the cassette which can be loaded into the recording and reproducing device of FIG. 1, whose housing comprises two housing halves and which accommodates a record carrier in the form of a magnetic tape, a coupling pin being provided at the free end of the magnetic tape.
Figure 4:
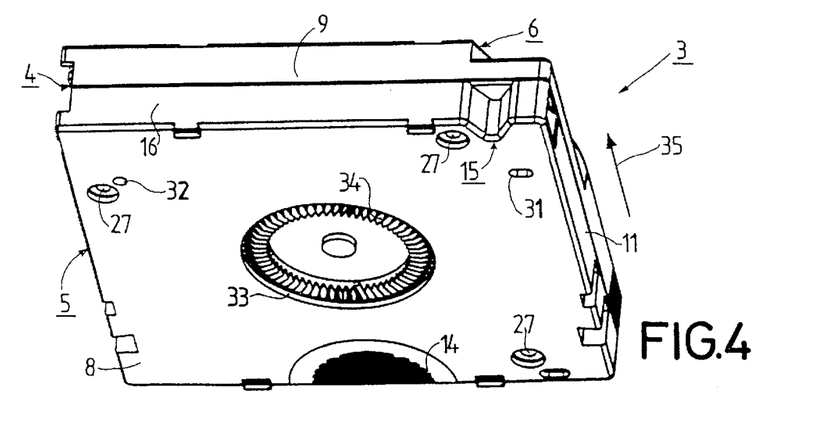
FIG. 4 is an oblique underneath view of the cassette shown in FIGS. 2 and 3.

The cassette 3 further has two positioning posts which project from the bottom wall 8 into the cassette interior and of which a positioning post 30 is visible through the access opening 17 in FIG. 2. Each of the positioning posts 30, as is shown in FIG. 4, has a blind hole, which blind holes serve as final positioning holes 31 and 32 by means of which the cassette 3 can be positioned definitively in the device 1 when the cassette 3 assumes its operating position in the device 1. The first final positioning hole 31 has an elongate cross-sectional shape. The second final positioning hole 32 is of circular cross-section.

In the bottom wall 8 a circular aperture 33 has been formed, through which drive teeth 34 of the supply reel 19 can be accessed by device-mounted reel drive means, with the aid of which the supply reel 19 is rotationally drivable.

It is to be noted that the cassette 3 can be inserted into the device 1 in a direction of insertion indicated by an arrow 35 in the FIGS. 1, 2, 3 and 4. Insertion may also be referred to as introduction or loading.

For holding the cassette 3 the device 1 has holder means 36, hereinafter briefly referred to as the lift 36. The lift 36 is essentially box-shaped and comprises an upper lift wall 37 and two lift side walls which are integral with the upper lift wall and project from the upper lift wall 37 towards the chassis 2, as well as two lift bottom walls which project from the lift side walls 48 and which extend towards one another, which lift bottom walls are spaced at such a distance from one another that there is adequate room for reel drive means between the two lift bottom walls. In a customary manner the reel drive means have drive teeth corresponding to the drive teeth 34 of the supply reel 19. In FIG. 1 the stator lamination assembly SK of a reel drive motor is shown to represent the reel drive means.

Figure 5:
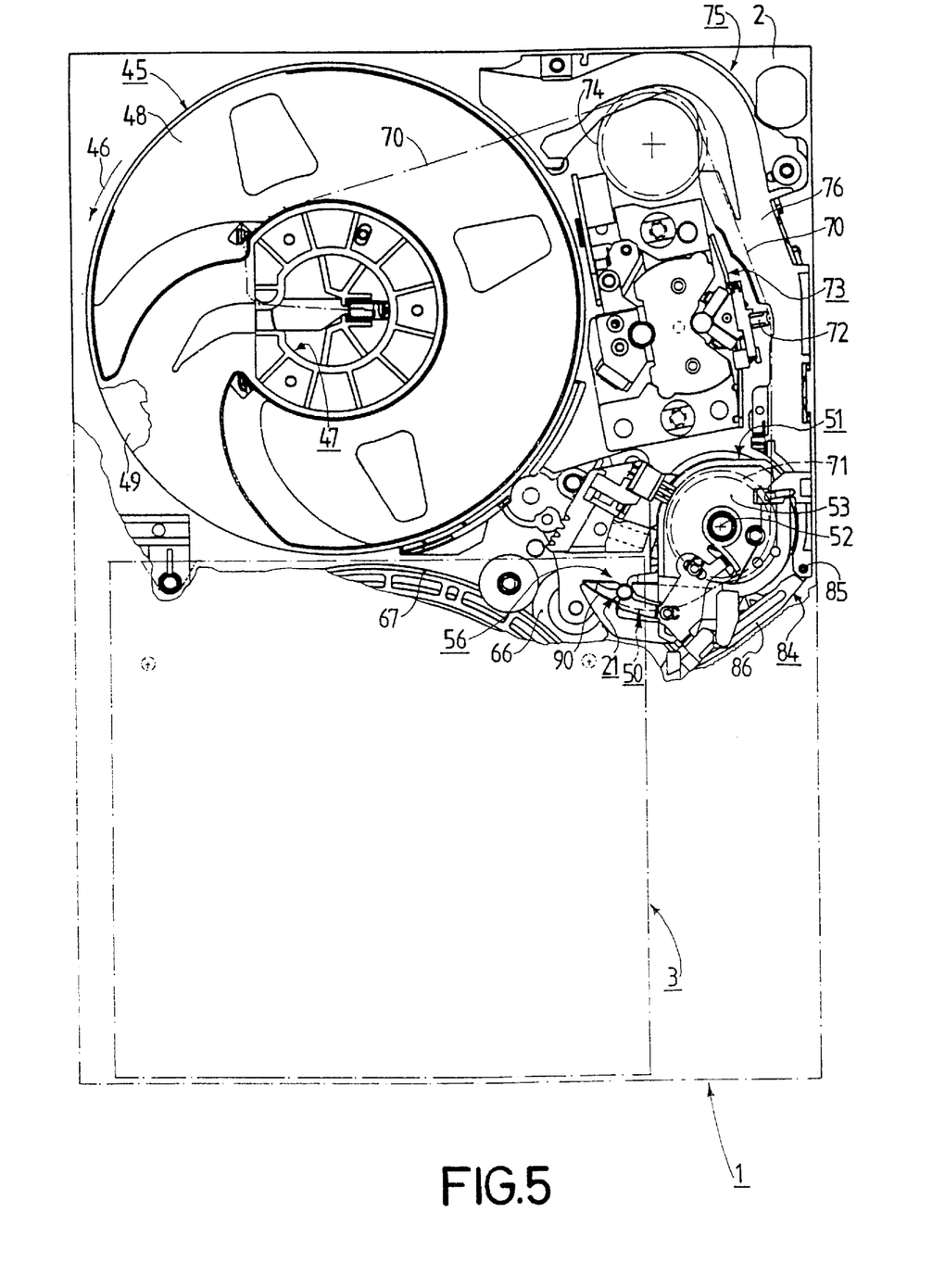
FIG. 5 shows the recording and reproducing device of FIG. 1 in basically the same way as FIG. 1 but only in part, the inserted cassette being in its operating position and a pull-out element of the device being coupled to the coupling pin of the cassette so as to form a pull-out assembly.

The lift 36 is movable between a loading position shown in FIG. 1, in which the cassette 3 can be inserted into the lift 36, and an operating position not shown in the Figures, in which the cassette 3 inserted into the lift 36 occupies its operating position, as shown in FIG. 5. The lift 36 is moved, in a manner known per se, along an L-shaped path of movement, the lift 36 first being moved from its loading position shown in FIG. 1 into its operating position in the direction of insertion 35 and, subsequently, in a direction towards the chassis 2 perpendicularly to the first direction of insertion 35.

In order to obtain this direction of movement the device 1 has guide means 38 including a first guide wall 39 and a second guide wall 40. The two guide walls 39 and 40 have guide channel slots or guide channels, which are engaged by guide pins which project laterally from the lift 36.

The device 1 has actuating means 41 for moving the lift 36. The actuating means 41 include two actuating slides 42 and 43 which are guided so as to be slidable parallel to the direction of insertion 35 and which are each connected to a gear rack, FIG. 1 showing only the gear rack 44 connected to the second actuating slide 42. Each of the actuating slides 42 and 43 has a cam surfaces which are inclined with respect to the plane of the chassis 2, which each cooperate with a cam follower which projects laterally from the lift 36, as a result of which the lift 36 is movable by moving the actuating slides 42 and 43.

The device 1 further includes a take-up reel 45. The take-up reel 45 is rotationally drivable by means of a reel drive motor, not shown. The take-up reel 45 serves for taking up the magnetic tape 20 accommodated in the cassette 3. In order to wind the magnetic tape 20 onto the take-up reel 45 the take-up reel 45 should be driven in the direction indicated by an arrow 46. In the present case the take-up reel 45 comprises a reel hub 47, an upper reel flange 48 which are integral with the reel hub 47, and a lower reel flange 49 which is connected to the reel hub 47 by means of an adhesive joint or by means of an ultrasonic weld. For the construction of the take-up reel 45 reference is made particularly to FIGS. 9, 10, 11 and 12.

In order to enable the magnetic tape 20 contained in the cassette 3 to be wound onto the take-up reel 45 the magnetic tape 20 should first be brought to the take-up reel 45 with the aid of the coupling pin 21. For this purpose, the device 1 has a pull-out element 50, whose constructional details are apparent in particular from FIG. 6 and FIG. 11. The pull-out element 50 is adapted to be coupled to the coupling element 21, i.e. to the coupling pin 21.

Figure 7:
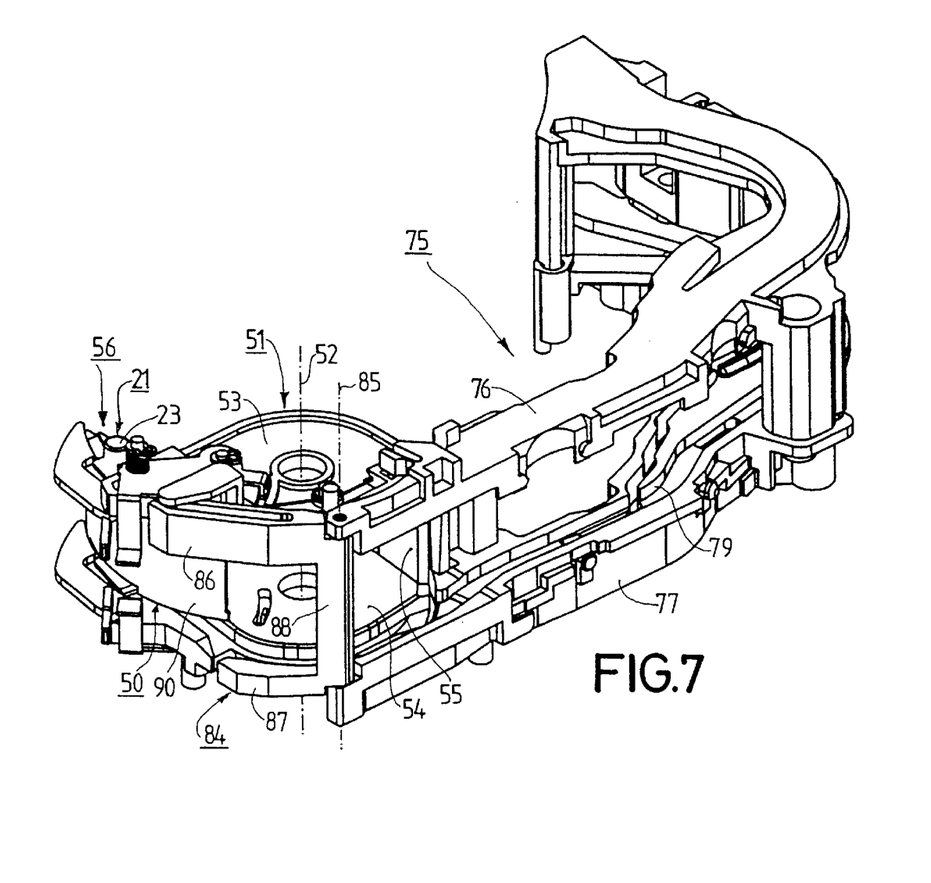
FIG. 7 is an oblique plan view showing guide means by which the pull-out assembly of FIG. 6 can be guided between retaining means and a take-up reel.

In order to enable the pull-out element 50 to be coupled to the coupling pin 21, the device 1 is constructed as follows. The device 1 includes retaining means 51 adapted to detachably retain the pull-out element 50, which retaining means are movable between a standby position shown in FIG. 1 and an operating position shown in FIG. 5. In the device 1 the retaining means 51 are mounted so as to be pivotable about a pivotal axis 52. The retaining means 51, which are also shown in FIG. 7, are substantially U-shaped and comprise two substantially planar retaining limbs 53 and 54 interconnected by a web 55. The pull-out element 50 is retained between the two retaining limbs 53 and 54 and in a manner not described in more detail it is ensured that the pull-out element 50 is held in a given initial position, i.e. is held in an area in which coupling with the coupling pin 21 is possible and, as a result of this, a pull-out assembly 56 consisting of the pull-out element 50 and the coupling pin 21 coupled to this element can be formed. The pull-out element 50 is shown in this initial position in FIG. 1. Said pull-out assembly 56 is clearly visible particularly. It is to be noted that after the pull-out element 50 has been coupled to the coupling pin 21 the pull-out element 50 together with the coupling pin 21, i.e. the whole pull-out assembly 56, can be detached by the retaining means 51, which will not be described in any further detail here.

In order to enable both the holder means (lift) 36 and the retaining means 51 to be moved, the device 1 has drive means 57, which include a motor 58 and a gear wheel transmission 59 which is drivable by a motor pinion, not shown. Only some of the gear wheels of the gear wheel transmission 59 are shown, namely a gear wheel 60, a gear wheel 61, a gear wheel 62, a gear wheel 63, a gear wheel 63', a retaining-means drive gear wheel 64, a further gear wheel 65, which is rotatable about the axis 52, a gear wheel 66, which is drivable by the further gear wheel 65 via further gear wheels not shown, as well as a ring-shaped gear wheel 67, which is drivable via gear wheels not shown, and an intermediate gear wheel 68 for direction reversal, which is drivable by the ring-shaped gear wheel 67.

When the cassette 3 is inserted into the lift 36, which is in its loading position shown in FIG. 1, the cassette 3 abuts against a stop of the lift 36 at the end the insertion movement, as a result of which lift 36 performs a small movement in the direction of insertion 35. This small movement of the lift 36 is detected by means of a photoelectric sensor, in response to which the motor 58 of the drive means 57 is switched on via the sensor. As a result of this, the retaining-means drive gear wheel 64 as well as the ring-shaped gear wheel 67 are driven via the gear wheel transmission 59. The ring-shaped gear wheel 67 is directly in driving engagement with the gear rack which is not visible in FIG. 1 and is connected to the second actuating slide 43 and is in driving engagement with the gear rack 44 of the first actuating slide 42 via the intermediate gear wheel 68. As a result, the two gear racks and, consequently, the two actuating slides 42 and 43 are moved in the insertion direction 35 with the aid of the ring-shaped gear wheel 67 and the intermediate gear wheel 68, so that the lift 36 is moved from its loading position shown in FIG. 1 into its operating position, not shown, in which the cassette 3 occupies its operating position shown in FIG. 5. As soon as the lift 36 has reached its operating position the further gear wheel 65 is disengaged from the gear wheel which can be driven by the further gear wheel 65 but which is not shown in FIG. 1, as a result of which the driving engagement with the lift 36 is interrupted.

However, the motor 58 is driven further, as a result of which the retaining-means drive gear wheel 64 is drive further. A rod spring is fastened to the retaining-means drive gear wheel 64 and has a free end which can come into contact with an actuating pin of the retaining means 51, namely after the lift 36 has reached its operating position. Via said rod spring and the actuating pin of the retaining means 51 the retaining means are pivoted in the direction indicated by the arrow 69 from their standby position shown in FIG. 1 into their operating position shown in FIG. 5, the pull-out element 50, which is retained by the retaining means 50, then being coupled to the coupling pin 21 of the cassette 3, as a result of which the pull-out assembly 56 is formed. As soon as the pull-out element 50 has been coupled to the coupling pin 21, this is detected by means of a further photoelectric sensor, after which the motor 58 of the drive means 57 is switched off with the aid of this sensor.

When the pull-out element 50 and the coupling pin 21 are coupled the pull-out element 50 is urged in the direction indicated by the arrow 69 against the coupling pin 21, which is held in its coupling position in the cassette 3 with the aid of the positioning forks 25 and 26, the coupling pin entering into a holding portion of the pull-out element 50. During this entry a retaining element 50A in the form of a spring-loaded slide is first moved away from the central portion 22 of the coupling pin 21 against the force of a spring. As soon as the coupling pin 21 has reached its end position shown in FIG. 6 the coupling pin 21 is urged against a respective retaining surface 50B at both ends by means of the spring-loaded retaining element 50A, as a result of which the coupling pin 21 is reliably and captively coupled to the pull-out element 50.

In order to enable the pull-out element 50 and the coupling pin 21, after they have been coupled, i.e. the pull-out assembly 56 thus formed, to be moved away from the retaining means 51 and to be moved up to the reel hub 47 of the take-up reel 45, the device 1 includes actuating means 70. In the device 1 the actuating means 70 are simply formed by a pull-out tape 70, which for the clarity of the drawings is shown as a dash-dot line in FIGS. 1 and 5. The pull-out tape is guided along a tape-transport path which is apparent from the dash-dot line in FIGS. 1 and 5. The tape-transport path is basically defined by a first tape guide roller 71, which is coaxial with the axis 52 and is disposed between the two retaining limbs 53 and 54 of the retaining means 51, by a magnetic head 72, which is supported on actuator means 73 for positioning the magnetic head 72 for the purpose of accurate tracking control, and by a second tape guide roller 74.

The pull-out tape 70 has one end connected to the pull-out element 50 and has its other end connected to the reel hub 47 of the reel hub 45. Thus, by driving the take-up reel 45 in the direction indicated by the arrow 46 the pull-out assembly 56 can be moved away from the retaining means 51 and up to the reel hub 47 of the take-up reel 45 with the aid of the pull-out tape 70 in a simple manner, in order to achieve that, on the one hand, the reel hub 47 and, on the other hand, the pull-out assembly 56 formed by the pull-out element 50 coupled to the coupling pin 21 are brought to each other.

During the movement of the pull-out assembly 56 away from the retaining means 51 and towards the reel hub 47 of the take-up reel 45 and also during the movement in the opposite direction the pull-out assembly 56 should be guided accurately and reliably, particular care being required to ensure that the pull-out assembly 56 is moved without contact past the two tape guide rollers 71 and 74 and, particularly, past the magnetic head 72. For this purpose the device 1 has first guide means 75 connected to the chassis 2 and second guide means which cooperate with the first guide means 75.

Figure 6:
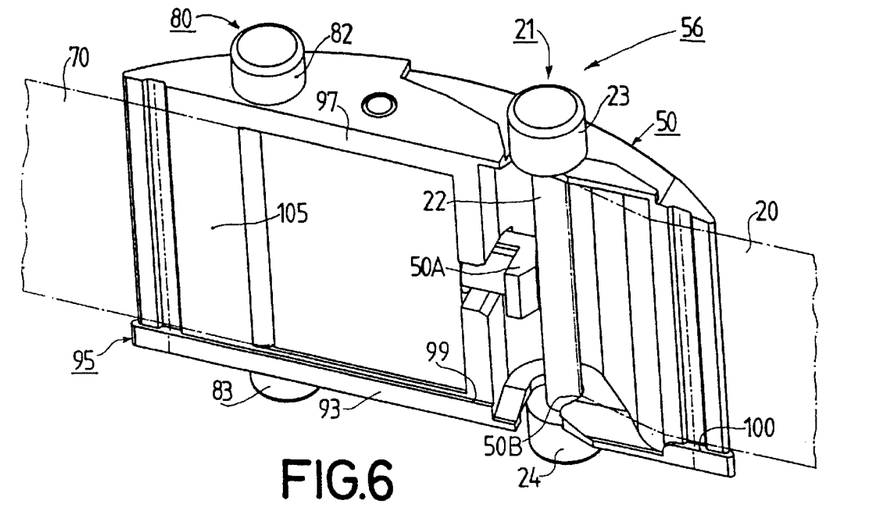
FIG. 6 is an oblique plan view showing the pull-out assembly formed in the recording and reproducing device of FIG. 5.

In the present case the second guide means are advantageously arranged on the coupling pin 21 and are formed by the two end portions 23 and 24 of the coupling pin, which end portions, as is apparent from FIG. 6, project beyond the pull-out element 50 and beyond the magnetic tape 20 in the width direction of the magnetic tape 20. The first guide means 75 connected to the chassis 2 comprise two guide members 76 and 77, which extend essentially adjacent the tape transport path and which, in the width direction of the magnetic tape 20, are spaced apart by a distance larger than the width of magnetic tape 20, and have each been provided with a guide channel 78 and 79, respectively. The first end portion 23 of the coupling pin 21 engages in the first guide channel of the first guide member 76. The second end portion 24 of the coupling pin 21 engages in the second guide channel 79 of the second guide member 77.

In the device 1 the pull-out element 50 in addition comprises third guide means provided on a guide pin 80. For the construction of the guide pin 80 reference is made to FIG. 6 and particularly to FIG. 9. Similarly to the coupling pin 21 the guide pin 80 has a comparatively thin central portion 81 and an upper first end portion 82 and a lower second end portion 83, the two end portions 82 and 83 having a larger diameter than the comparatively thin central portion 81. The diameter of the two end portions 82 and 83 of the guide pin corresponds to the diameter of the two end portions 23 and 24 of the coupling pin 21. The guide pin 80 is made of a metal, namely steel. The third guide means are formed by the two end portions 82 and 83 of the guide pin 80, which like the second guide means, i.e. the two end 23 and 24 of the coupling pin 21, cooperate with the first guide means 75, i.e. with the two guide members 76 and 77, the first end portion 82 of the guide pin 80 engaging in the first guide channel 78 of the first guide member 76 and the second end portion 83 of the guide pin 80 engaging in the second guide channel 79 of the second guide member 77.

As is apparent from FIG. 7, there have been provided guide means 84 which are movable by the two guide members 76 an 77 in the area of the ends of said members which face the retaining means 51. The movable guide means 84 are movable between a rest position shown in FIG. 1 and a guiding position shown in FIGS. 5 and 6. In order to enable the movable guide means 84 to be moved the movable guide means 84 are mounted on the two guide members 76 and 77 so as to be movable about a pivotal axis 85. The movable guide means 84 are substantially U-shaped and have an upper first guide arm 86 and a lower second guide arm 87, which are connected to one another by a web portion 88. The movable guide means 84 are moved in dependence on the movement of the retaining means 51, but this will not be described any further here. By means of the two guide arms 86 and 87 the pull-out assembly 56 can be moved from its initial position shown in FIG. 7 around the retaining means 51 and the first tape guide roller 71 present in the retaining means 51 until the pull-out assembly 56, i.e. the guide pin 80 and the coupling pin 21 reach the two guide channels 78 and 79 in the two guide members 76 and 77.

Figure 8:
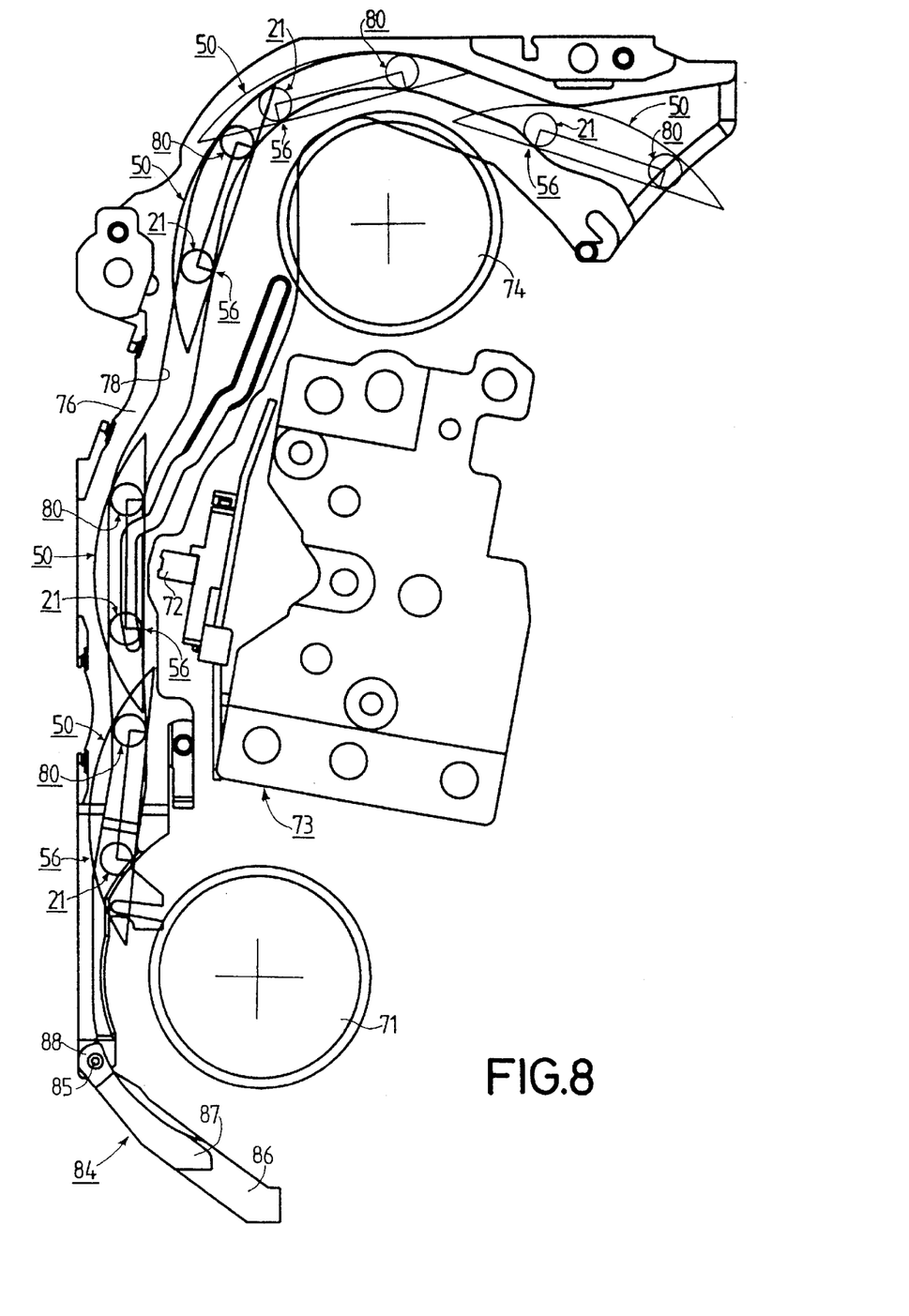
FIG. 8 is an underneath view of a guide member with a guide channel of the guide means shown in FIG. 7.

The guide means described hereinbefore guarantee a particularly reliable and accurate movement of the pull-out assembly 56 between the retaining means 51 and the reel hub 47 of the take-up reel 45 without the pull-out assembly 56 coming into contact with the two tape guide rollers 71 and 74 and the magnetic head 72. In this respect reference is made particularly to FIG. 8, which shows the pull-out assembly 56 in five different positions which the pull-out assembly 56 can occupy during its movement between the retaining means 51 and the reel hub 47 of the take-up reel 45.

As already stated hereinbefore, the pull-out assembly 56 can be moved away from the retaining means 51 to the reel hub 47 of the take-up reel 45 by means of the pull-out tape 70 by the rotation of the take-up reel 45 in the direction indicated by the arrow 46, in order to bring the reel hub 47 and the pull-out assembly 56 into engagement. In order to make this possible the reel hub 47 has a shape which differs from a circularly cylindrical shape in that a portion having the shape of a circular segment is missing. This portion serves to accommodate the pull-out assembly 56 where, viewed in the axial direction of the reel hub 47 of the take-up reel 45, the coupling pin 21 is situated wholly within the pull-out element 50 and, viewed in the axial direction of the reel hub 47, the pull-out element 50 basically has the shape of a circular segment. When the reel hub 47 of the take-up reel 45 and the pull-out assembly 56 have been brought into engagement a partly cylindrical circumferential surface 89 of the reel hub 47 and a partly cylindrical circumferential surface 90 of the pull-out assembly 56 together form a cylindrical winding surface onto which the magnetic tape 20 can be wound, as can be seen in FIG. 11.

Figure 11:
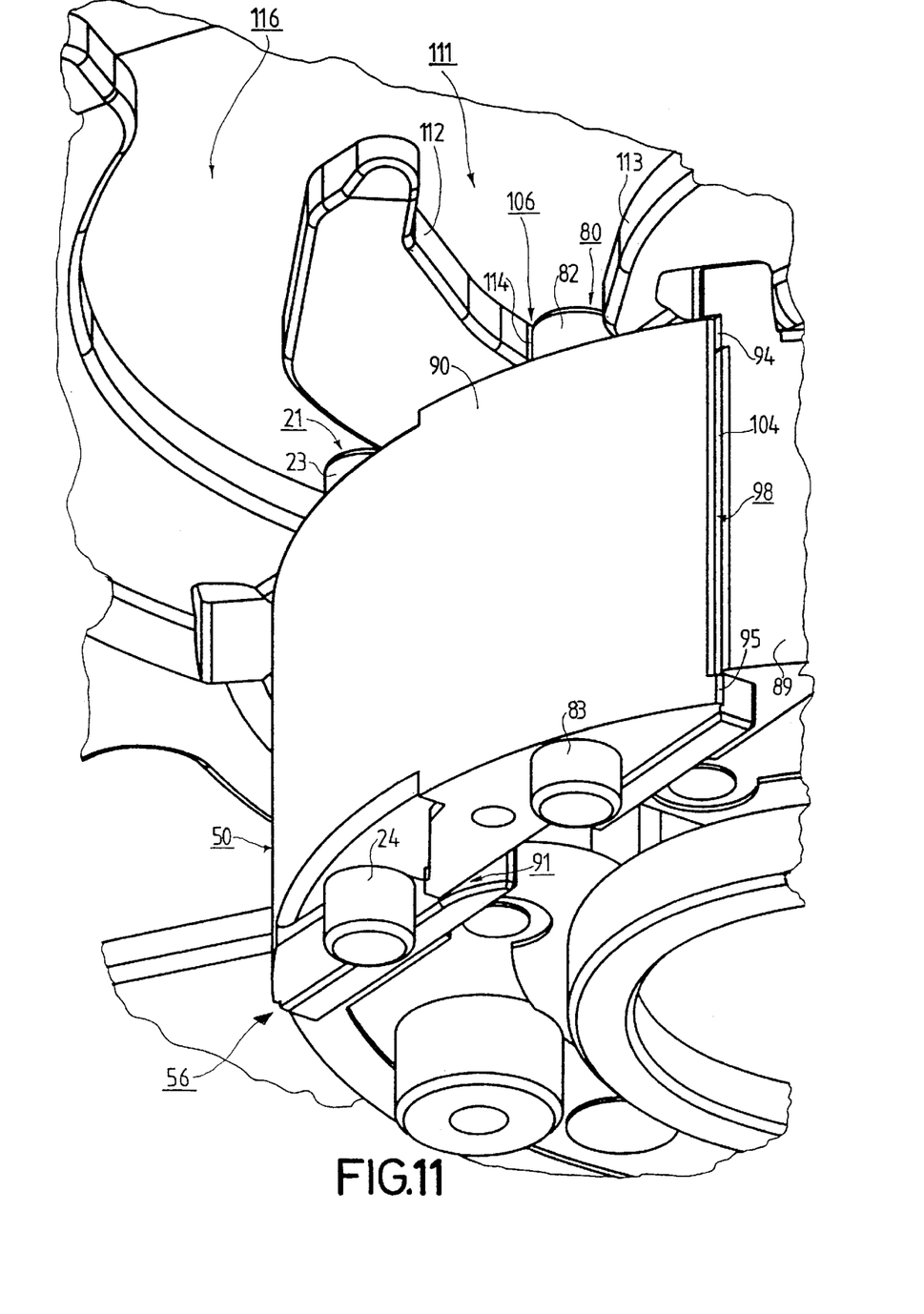
FIG. 11 is an oblique underneath view showing a part and a part of the upper reel flange of the reel hub of the take-up reel and the pull-out assembly of FIG. 6 which has been moved to the reel hub.
Figure 12:
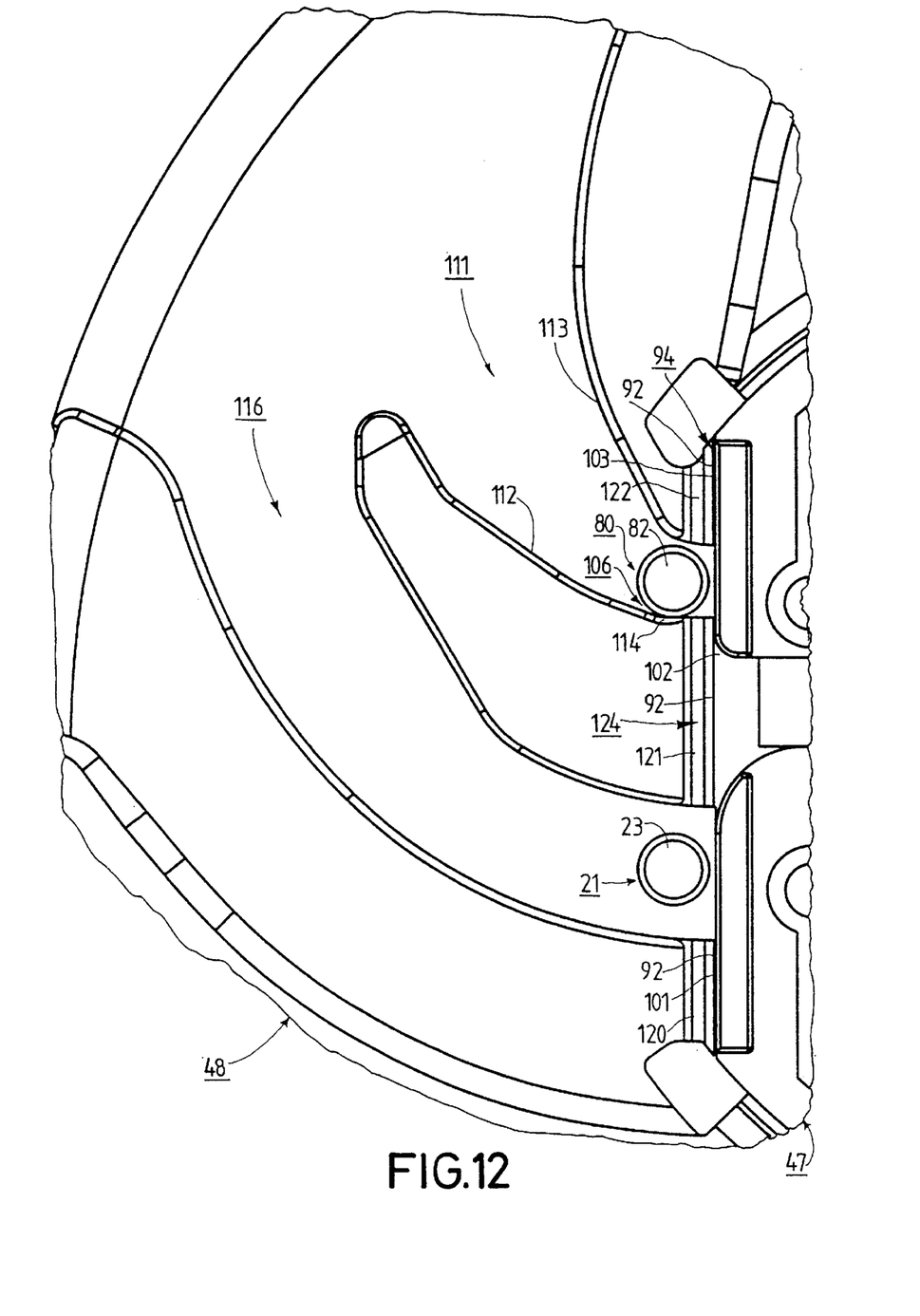
FIG. 12 is an underneath view showing a part of the reel hub and a part of the upper reel flange of the take-up reel and, in addition, shows the coupling pin and a guiding and positioning pin.

As is further apparent from FIG. 11, the reel hub 47 and the pull-out assembly 56 adjoin one another in the area of a separating zone 91, where they lie against each other with two narrow positioning surfaces 92 (see FIG. 9) and 93 (see FIG. 6) which are spaced apart in the axial direction of the reel hub 47, which extend parallel to the axial direction and which are formed by lateral surfaces of two projecting portions 94 (see FIGS. 9 and 11) and 95 (See FIGS. 6 and 11) which extend perpendicularly to the axial direction, and with two corresponding surfaces 96 (FIG. 9) and 97 (FIG. 6) which extend parallel to the axial direction and which each face a respective positioning surface 93 or 92. The reel hub 47 and the pull-out assembly 56 are situated between the two projecting portions 94 and 95 and enclose an intermediate space 98.

As is apparent from the above description, a first projecting portion 94 of said two projecting portions 94 and 95 projects from the reel hub 45 and the second projecting portion 95 projects from the pull-out assembly 56. The second projecting portion 95 is connected only to the pull-out element 50 of the pull-out assembly 56 and the second projecting portion 95 projects only from the pull-out element 50.

As is apparent from FIG. 6, the second projecting portion 95 is formed by a rib of the pull-out element 50, which rib comprises a first rib portion 99 and a second rib portion 100 and has a gap between the two rib portions 99 and 100 as an opening for the passage of a portion of the coupling pin 21. The second positioning surface 93 comprises tow surface portions corresponding to the two rib portions 99 and 100 of the second projecting portion 95.

Figure 9:
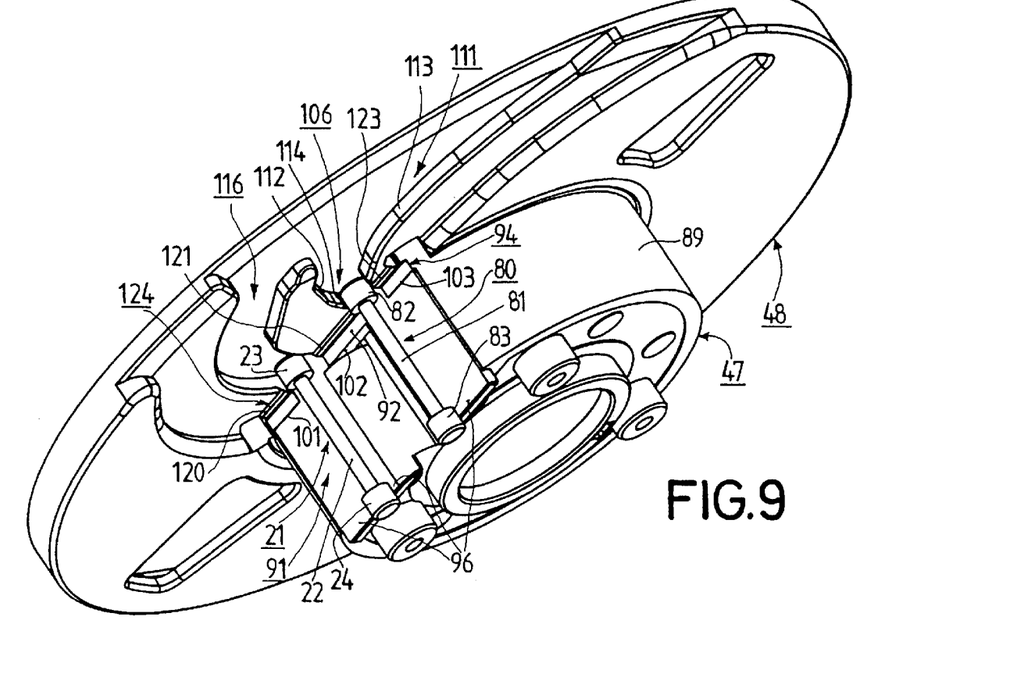
FIG. 9 is an oblique underneath view showing the reel hub of the take-up reel of the recording and reproducing device of FIGS. 1 and 5, as well as the upper reel flange which is integral with the reel hub.
Figure 10:
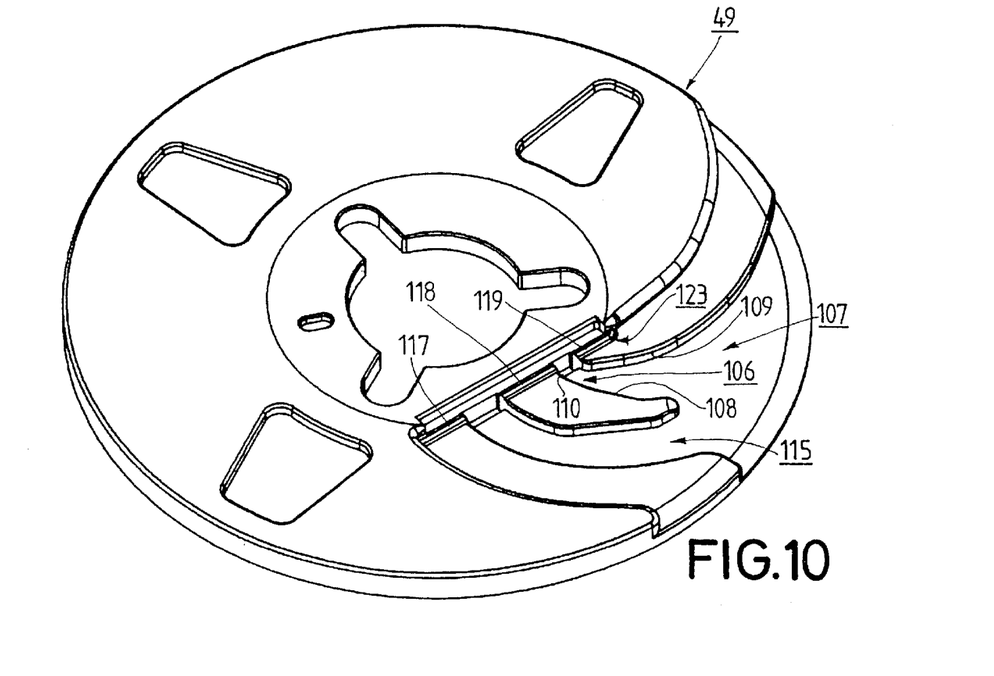
FIG. 10 is an oblique plan view showing the lower reel flange of the take-up reel.

As is apparent from FIG. 9, the first projecting portion 94 is formed by a rib of the reel hub 47 of the take-up reel 45 and comprises a first rib portion 10, a second rib portion 102 and a third rib portion in such a manner that a gap for the passage of a portion of the coupling pin 21 exists between the first rib portion 101 and the second rib portion 102 and a gap for the passage of the guide pin 80 exists between the second rib portion 102 and the third rib portion 103. The first positioning portion 92 comprises three surface portions corresponding to the three rib portions 101, 102 and 103 of the first projecting portion 94.

In the intermediate space 98 between the two projecting portions 94 and 95 the reel hub 47 of the take-up reel 45 and the pull-out assembly 56 are spaced from one another with intermediate space bounding surfaces 104 and 105, the first intermediate space bounding surface 104 being provided on the reel hub 47 and the second intermediate space bounding surface 105 on the pull-out element 50 of the pull-out assembly 56. The pull-out tape 70 can be wound onto reel hub 47 in the area of the partly cylindrical circumferential surface 89 of the reel hub 47 of the take-up reel 45 and in the area of the first intermediate space bounding surface 104 of the reel hub 47 of the take-up reel 45. When the reel hub 47 of the take-up reel 45 and the pull-out assembly 56 have been brought into engagement with one another the pullout tape 70 at least one layer of the pull-out tape 70 lies in the intermediate space 98. In the present case at least two layers of the pull-out tape 70 are situated in the intermediate space 98.

The two projecting portions 94 and 95, of which the first projecting portion 94 projects from the reel hub 47 and the second projecting portion 95 projects from the pull-out element 50 of the pull-out assembly 56, guarantee a particularly accurate radial positioning of the pull-out assembly 56 on the reel hub 47.

When the reel hub 47 of the take-up reel 45 and the pull-out assembly 56 have been brought into engagement the reel hub 47 and the pull-out assembly 56 are positioned with respect to one another in a tangential direction of the reel hub 47 with the aid of tangential positioning means 106.

The pull-out assembly 56 has a lower positioning projection which extends in the axial direction of the reel hub 47 and which projects from the pull-out assembly 56 towards the lower reel flange 49 and in the present case this projection is formed by the second end portion 83 of the guide pin 80. Thus, in the present case the guide pin 80 at the same time forms a cylindrical positioning pin. The lower reel flange 49 (see FIG. 10) has a passage 107 for the lower positioning projection, i.e. for the second end portion 83 of the guide pin 80, which passage is bounded by two bounding surfaces 108 and 109 which extend parallel to the axial direction of the reel hub 47. In the present case the first bounding surface 108 of the these two bounding surfaces 108 and 109 is formed as the lower positioning surface 110 in its area at the hub side. The lower positioning projection, i.e. the second end portion 83 of the guide pin 80, and the lower positioning surface 110 belong to the tangential positioning means 106.

The pull-out assembly 56 further comprises an upper positioning projection which extends in the axial direction of the reel hub 47 and which projects from the pull-out assembly 56 toward the upper reel flange 48, which positioning projection in a particularly simple manner is formed by the first end portion 82 of the guide pin 80. The upper reel flange (see FIG. 9) has a passage 111 for the upper positioning projection, i.e. for the first end portion 82 of the guide pin 80, which passage is bounded by two bounding surfaces 112 and 113 which extend parallel to the axial direction of the reel hub 47. The first bounding surface 112 of the two bounding surfaces 112 and 113 forms the upper positioning surface 114 in the area of its end at the hub side. The upper positioning projection, i.e. the end portion 82 of the guide pin 80, and the upper positioning surface 114 also belong to the tangential positioning means 106.

It is to be noted that the lower reel flange 49 has a further passage 115 in order to accommodate the second end portion 24 of the coupling pin 21. The upper reel flange 48 likewise has a second passage 116 in order to accommodate the first end portion 23 of the coupling pin 21. Furthermore, it is to be noted that all the bounding surfaces of the passages 107, 111, 115 and 116 have an approximate involute shape because this allows a trouble-free engagement and disengagement of the end portions 23 and 24 of the coupling pin 21 and the end portions 82 and 83 of the guide pin 80.

When the pull-out tape 70 is wound onto the reel hub 47 the pull-out assembly 56 approaches the reel hub 47 towards the end of this winding operation and at the end of this approach the free end portions 82 and 83 of the guide pin 80, which in the present case is advantageously used at the same time as the positioning pin, engage with the positioning surface 110 and 114 of the tangential positioning means 106, which also guarantees an accurate tangential positioning of the pull-out element 56 with respect to the reel hub 47.

It is to be noted that both in the area of its side which faces the lower reel flange 49 and in the area of its side which faces the upper reel flange 48 the reel hub 47 of the take-up reel 45 has a ramp surface 123 and 124, respectively, which each comprise three ramp portions 117, 118, 119 and 120, 121, 122, respectively, the pull-out assembly 56 running onto said ramp surfaces as the assembly engages the reel hub 47, as a result of which the pull-out assembly 56 is positioned on the reel hub 47 in the height direction, i.e. in the axial direction of the reel hub 47.

Figure 13:
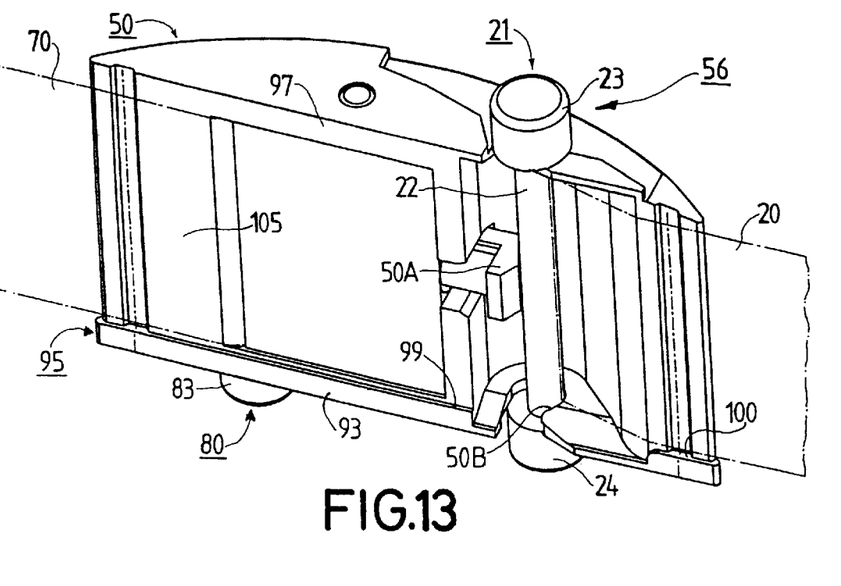
FIG. 13 shows, in a view similar to that in FIG. 6, a pull-out assembly formed in a recording and reproducing device in accordance with a second embodiment of the invention.

FIG. 13 shows another pull-out assembly 56 as formed in a recording and reproducing device in accordance with a second embodiment of the invention. This pull-out assembly 56 also includes a guide pin 80 but, in contradistinction to the pull-out assembly 56 shown in FIG. 6, this pin has only a lower end portion 83. This lower end portion 83 can also be used for guiding the pull-out assembly 56 during its movement between the retaining means and the reel hub of a take-up reel but is primarily intended as lower positioning projection of tangential positioning means.

What is claimed is:

1. A recording and/or reproducing device (1), into which a cassette (3) can be loaded, which cassette comprises a housing (4) and a rotationally drivable supply reel (19) accommodated in the housing (4) and a record carrier (20) in the form of a tape wound onto the reel hub of the supply reel (19) and a coupling element (21) connected to the record carrier (20) in the area of the free end of the record carrier (20) and held in a coupling position, and which comprises a rotationally drivable take-up reel (45) having a reel hub (47) and a lower reel flange (49), and which comprises a pull-out element (50) constructed to be coupled to the coupling element (21), and which comprises retaining means (51) constructed to detachably retain the pull-out element (50) and enabling the pull-out element (50) to be retained in an area in which a coupling to the coupling element (21) can be effected and thereby a pull-out assembly (56) can be formed, which pull-out assembly comprises the pull-out element (50) and the coupling element (21) coupled thereto, and by which retaining means the pull-out element (56) is detachable after its coupling to the coupling element (21), and which comprises actuating means (70) by which the pull-out assembly (56) can be moved away from the retaining means (51) and up to the reel hub (47) of the take-up reel (45), in order to bring into engagement with one another, on the one hand, the reel hub (47) and, on the other hand, the pull-out assembly (56) comprising the pull-out element (50) and the coupling element (21) coupled thereto, where with the pull-out assembly (56) brought into engagement with reel hub (47) of the take-up reel (45)

a) a partly cylindrical circumferential surface (89) of the reel hub (47) and a partly cylindrical circumferential surface (90) of the pull-out assembly (56) together form a cylindrical winding surface onto which the record carrier (20) in the form of a tape can be wound, and b) the reel hub (47) and the pull-out assembly (56) adjoin one another in the area of a separating zone (91), and c) the reel hub (47) and the pull-out assembly (56) are positioned with respect to one another in a tangential direction of the reel hub (47) with the aid of tangential positioning means (106), characterized in that the pull-out assembly (56) has a lower positioning projection (83) which extends in the axial direction of the reel hub (47) of the take-up reel (45) and which projects from the pull-out assembly (56) towards the lower reel flange (49), and the lower reel flange (49) has a passage (107) for the lower positioning projection (83), which passage is bounded by two bounding surfaces (108, 109) which extend parallel to the axial direction, and at least one bounding surface (108) of these two bounding surfaces (108, 109) is formed as a lower positioning surface (110) in the area of its end at the hub side, and the lower positioning projection (83) and the lower positioning surface (110) belong to the tangential positioning means (106).

2. A recording and/or reproducing device (1) as claimed in claim 1, characterized in that the take-up reel (45) has an upper reel flange (48) and the pull-out assembly (56) has an upper positioning projection (82) which extends in the axial direction of the reel hub (47) of the take-up reel (45) and which projects from the pull-out assembly (56) towards the upper reel flange (48), and the upper reel flange (48) has a passage (111) for the upper positioning projection (82), which passage is bounded by two bounding surfaces (112, 113) which extend parallel to the axial direction, and at least one bounding surface (112) of these two bounding surfaces (112, 113) is formed as an upper positioning surface (114) in the area of its hub side, and the upper positioning projection (82) and the upper positioning surface (114) belong to the tangential positioning means (106).

3. A recording and/or reproducing device (1) as claimed in claim 2, characterized in that the lower positioning projection (83) and the upper positioning projection (82) are each of circular cross-section and are coaxial with one another.

4. A recording and/or reproducing device (1) as claimed in claim 3, characterized in that the lower positioning projection (83) and the upper positioning projection (82) are formed by the end portions of a cylindrical metal positioning pin (80).

5. A recording and/or reproducing device (1) as claimed in claim 4, characterized in that the metal positioning pin is connected only to the pull-out element (50) of the pull-out assembly (56), and the connection between the pull-out element (50) and the positioning pin (80) is formed by molding around the positioning pin (80).

* * * * *